United States Patent
Rao et al.

(10) Patent No.: US 6,321,287 B1
(45) Date of Patent: Nov. 20, 2001

(54) CONSOLE REDIRECTION FOR A COMPUTER SYSTEM

(75) Inventors: Anil V. Rao; Joe A. Vivio; Robert G. Bassman; Wai-Ming Richard Chan, all of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/174,741

(22) Filed: Oct. 19, 1998

(51) Int. Cl.$^7$ ....................................................... G06F 13/24
(52) U.S. Cl. ............................... 710/260; 710/48; 345/2.1
(58) Field of Search ..................... 710/48, 260; 709/217, 709/219; 345/2.1; 703/23, 24, 25

(56) References Cited

U.S. PATENT DOCUMENTS

| | | | |
|---|---|---|---|
| 4,298,860 | 11/1981 | Norberg et al. | 340/825.04 |
| 4,346,446 | 8/1982 | Erbstein et al. | |
| 4,356,545 | 10/1982 | West | |
| 4,680,788 | 7/1987 | Cordeiro et al. | 379/93 |
| 5,224,207 | 6/1993 | Fillion et al. | |
| 5,367,670 | 11/1994 | Ward et al. | |
| 5,402,431 | 3/1995 | Saadeh et al. | 371/67.1 |
| 5,410,706 | 4/1995 | Farrand et al. | |
| 5,440,699 | 8/1995 | Farrand et al. | |
| 5,604,509 * | 2/1997 | Moore et al. | 345/2 |
| 5,630,066 | 5/1997 | Gosling | |
| 5,748,913 | 5/1998 | Shibahara | |
| 5,812,785 * | 9/1998 | Lappen et al. | 709/231 |
| 6,098,143 * | 8/2000 | Humpherys et al. | 710/260 |

OTHER PUBLICATIONS

"Intel Platforms For Visual Computing: A White Paper On Intel's Visual Computing Initiative", Mar. 24, 1997, Http://www.intel.com/intel/march24/techinfo.htm, 8 pages, Downloaded May 28, 1998.

"Accelerated Graphics Port (AGP)", Http://developer.intel.com/technology/agp/index.htm, 4 pages.

Richard Malinowski, "AGP Done Right: Combine The Pentium® II Processor With The Intel 440LX AGPset", Http://developer.intel.com/solutions/archive/issue4/stories/top1.htm, 3 pages, Downloaded May 28, 1998.

Intel Corporation, "Accelerated Graphics Port Interface Specification: Revision 2.0", May 4, 1998, pp. 2–259.

* cited by examiner

Primary Examiner—Glenn A. Auve
(74) Attorney, Agent, or Firm—Skjerven Morrill MacPherson LLP; David G. Dolezal

(57) ABSTRACT

A system for enabling remote console redirection on a computer system having a remote monitor connector circuit located on a different computer bus than a local monitor connector circuit. In one example, a remote monitor connector circuit located on a PCI computer bus generates system management interrupts (SMIs) via an interrupt controller to a system processor of a computer system such as a server. In response to a SMI, the system processor invokes an interrupt handler to determine the source of the interrupt. In response to determining that the SMI was generated by the remote monitor connector circuit, the system processor places the video data being provided to a local monitor connector circuit (such as a graphics accelerator conforming to the Accelerated Graphics Port interface standard) into a shared memory location accessible by both the system processor and the remote monitor connector circuit. The remote monitor connector circuit provides the video data to a remote monitor via e.g. a telephone network for display on the remote monitor. The remote monitor connector circuit generates the SMIs periodically during a startup routine until a graphical mode operating system boots up.

55 Claims, 7 Drawing Sheets

CONSOLE REDIRECTION FOR A
COMPUTER SYSTEM

BACKGROUND OF THE INVENTION

1. Field of the Invention

This invention relates in general to computer systems and more specifically to console redirection in computer systems.

2. Description of the Related Art

Remote console emulation of a local console of a computer system such as a server allows a system manager at a remote location to monitor, manage, configure, and trouble shoot the server without having to be physically present at the server location. In remote console emulation, video data such as text and graphics that are displayed on a local monitor are provided to and displayed on a remote monitor for viewing by a remote user such as a system manager. Also with remote console emulation, keystrokes and pointer entries made with a remote keyboard and pointer (such as a mouse) are provided to the server and have the same effect on the server as with keystrokes and pointer entries made by a local keyboard and local pointer device, respectively.

In the past, console redirection has been accomplished by placing a remote video controller on the same computer bus (such as a Peripheral Component Interconnect (PCI) bus) as a local video controller (such as a VGA controller). The remote video controller receives video data by snooping the writes on the computer bus to the local video controller from the system processor. Data from the local controller (such as from the local keyboard) is obtained by trapping or chaining the interrupts from the local video controller to the system processor.

Another technique of console redirection is disclosed in Farrand et al, U.S. Pat. No. 5,440,699. In Farrand, console redirection is accomplished by a system management board or card accessing the video data in the video memory portion of the system memory by bus mastering and providing that video data to a remote monitor.

The above techniques for console redirection require that the video controller for the local and remote video monitors reside on the same computer bus (as with the first technique), that the video data be accessible in the system memory by both controllers, and/or that the video data writes to the local video controller are detectable by the remote monitor video controller.

With the increase in speed and memory of today's computer systems, new standards for providing video data to monitors are being utilized to increase the speed of video data transfers to enable a monitor to display relatively complex graphics such as moving 3-D images. One such standard for increasing the amount of data that can be provided to a monitor is the Accelerated Graphics Port Interface Standard (AGP standard). A description of an AGP standard can be found in the ACCELERATED GRAPHICS PORT INTERFACE SPECIFICATION, Rev 2.0, May 4, 1998, by the INTEL CORPORATION which is hereby incorporated by reference. In a computer system implementing circuitry conforming to the AGP system, video data is obtained by the local monitor connector circuit as per the AGP standard.

One problem of performing console redirection in computer system utilizing AGP compliant components to provide video data to a local monitor is that it is relatively impractical and/or impossible for a remote monitor connector circuit coupled to the computer system via another computer bus (such as a PCI bus) to snoop the video data being provided to the AGP compliant video controller. Typically, video data transfers to an AGP compliant video controller are not seen on the PCI bus.

SUMMARY OF THE INVENTION

It has been discovered that providing a computer system with a remote monitor connector circuit that generates an interrupt to a system processor to obtain video data being provided to another video connector circuit advantageously enables remote console emulation for a system whose local monitor connector circuit is operably coupled to the system processor and/or memory via a different computer bus than the remote monitor connector circuit.

In one aspect of the invention, a computer system includes a system processor and a first monitor connector circuit operably coupled to the system processor. The first monitor connector circuit being provided video data for display on a first display monitor when operably coupled to the first monitor connector circuit. The computer system also includes a second monitor connector circuit operably coupled to the system processor. The second monitor connector circuit provides the video data to a second display monitor for display thereon. The second monitor connector circuit generates an interrupt to the system processor to obtain video data being provided to the first monitor connector circuit.

In another aspect, the invention includes a method for performing remote monitor redirection in a computer system. The method includes providing video data to a local monitor connector circuit, generating an interrupt to a system processor, and providing the video data to a remote monitor connector circuit in response to the interrupt for display on a remote display monitor.

In another aspect, the invention includes a connector circuit for providing video data to a remote monitor for remote monitor redirection. The connector circuit includes a connector for operably coupling the connector circuit to a computer bus and a controller. The controller generating an interrupt to a system processor for the connector circuit to obtain via the computer bus and via the connector video data provided to a local monitor connector circuit.

In another aspect of the invention, a server includes a system processor, a system memory operably coupled to the system processor, and a local monitor connector circuit operably coupled to the system processor. The local monitor connector circuit being provided video data for display on a local display monitor when operably coupled to the local monitor connector circuit. The local monitor connector circuit including circuitry substantially compliant with an Accelerated Graphics Port (AGP) standard. The server further includes a computer bus and a remote monitor connector circuit operably coupled to the system processor via the computer bus. The remote monitor connector circuit providing video data to a remote monitor for display thereon. Wherein during a startup routine executed by the system processor, the remote monitor connector circuit generates a system management interrupt (SMI) to the system processor to obtain the video data provided to the local monitor connector circuit.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of a mode for carrying out the invention. The description is intended to be illustrative of the invention and should not be taken to be limiting.

Figure 1:
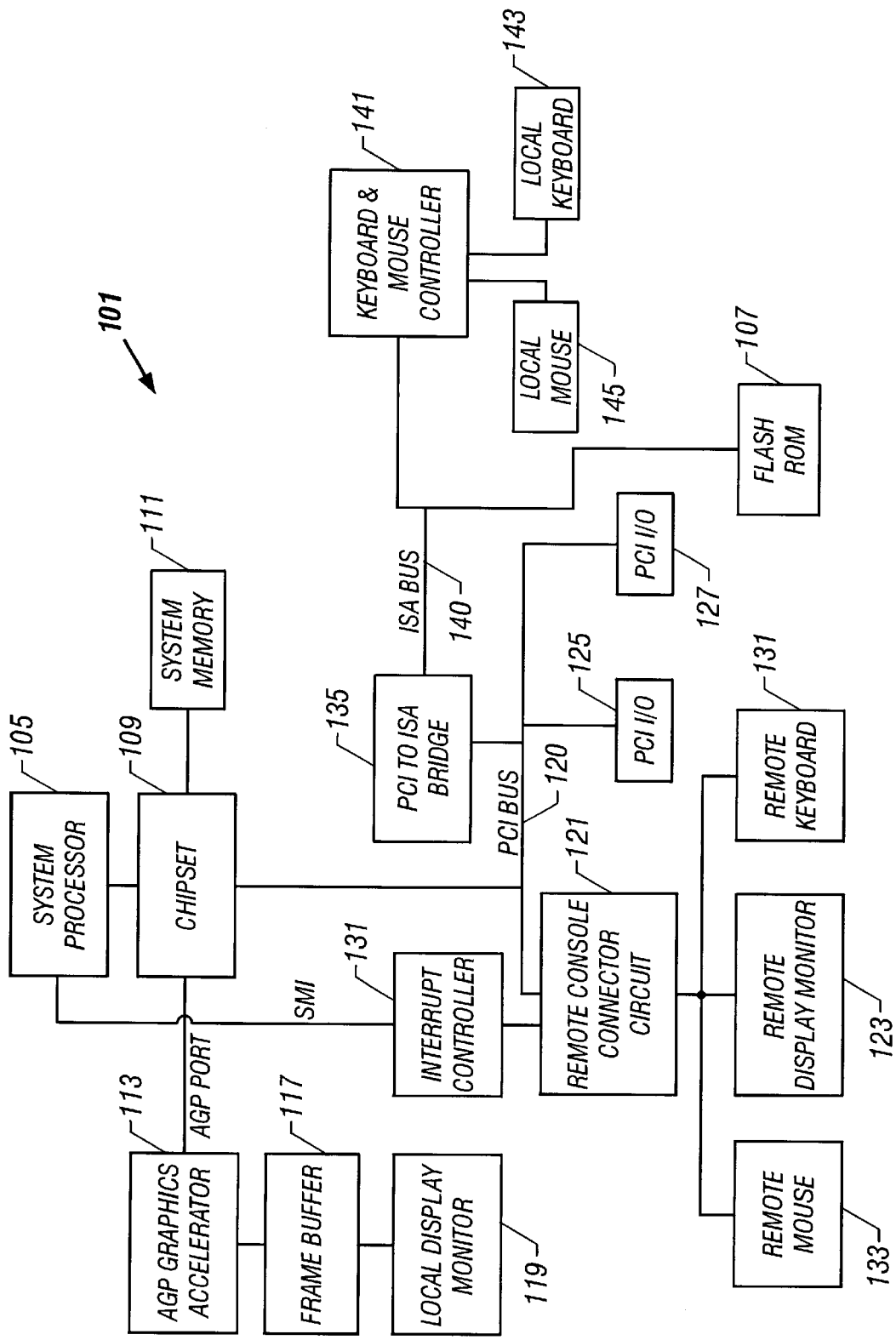
FIG. 1 is a block diagram of a computer system according to the present invention.

FIG. 1 is a block diagram of a computer system according to the present invention. Computer system 101 is a server that includes a system processor 105, such as the PENTIUM II microprocessor sold by the INTEL CORP. The system processor 105 is operably coupled to a system memory via a chipset such as the 440BX sold by the INTEL corporation. Computer system 101 also includes a local display monitor 119 operably coupled to the computer system 101 via a frame buffer 117 and a local monitor connector circuit 113 that includes a graphics accelerator that is compliant with the AGP specification. The AGP graphics accelerator is operably coupled to the system memory 111 and system processor 105 via chipset 109.

Server 101 provides data storage to a plurality of computer systems operably coupled to server 101 via a computer network such as a local area network (LAN) or wide area network (WAN) (not shown). Typically, such servers include a plurality of hard disk drives, or other storage devices, which store computer data. An example of a server is the POWEREDGE 2300 sold by the DELL COMPUTER CORP.

Computer system 101 also includes a computer bus 120 which conforms to the Peripheral Component Interconnect (PCI) standard. A local keyboard 143 and local pointer device 145 (e.g. a mouse) are operably coupled to the computer system via a keyboard and mouse controller 141. Keyboard controller 141 is operably coupled to the system processor 105 via a computer bus 140 conforming to the Industry Standard Architecture (ISA) standard, a PCI to ISA bridge 135, PCI bus 120, and chipset 109. Typically, local keyboard 143 and mouse 145 are physically located adjacent to the local display monitor 119 to comprise a local console, all of which being physically located adjacent to the server housing. However, some servers did not include a local display monitor and/or keyboard.

Operably coupled to computer system 101 are a Flash ROM 107 (coupled via the ISA bus 140) and other PCI I/O 125 and 127 which may include, for example, a PCI network controller or a hard disk drive controller.

Computer system 101 incorporates remote console emulation. Video data that is displayed on the local monitor 119 is also provided to the remote display monitor 123 for display thereon. In addition, keyboard entries made on a remote keyboard 131 and mouse entries made on a remote mouse 133 have the same effect as entries made by local keyboard 143 and mouse 145. The remote mouse 133, display monitor 123, and keyboard 131 comprise a remote console and are all operably coupled to the computer system 101 via a remote console connector circuit (RCCC) 121.

Figure 2:
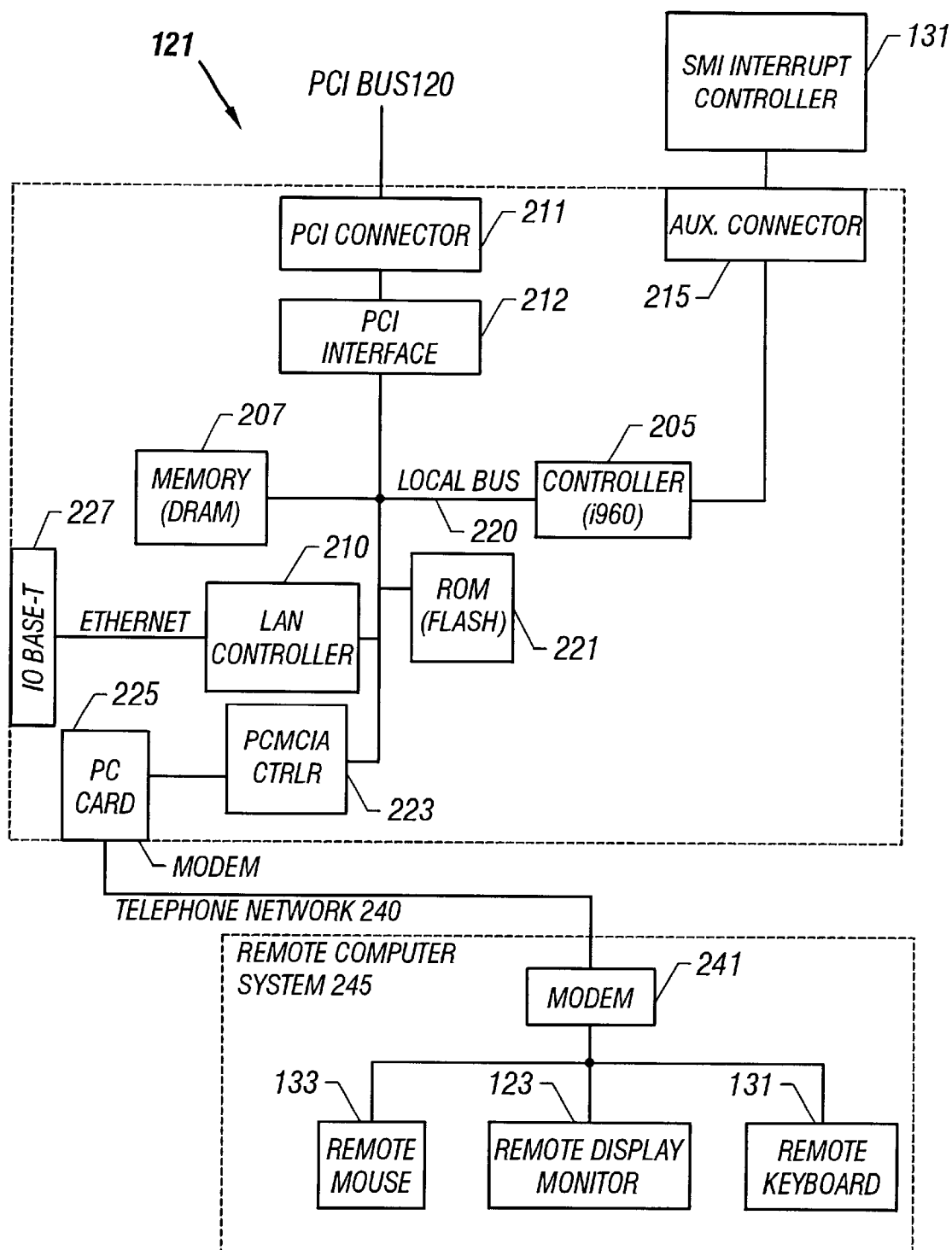
FIG. 2 is a block diagram of a remote console connector circuit according to the present invention.

FIG. 2 is a block diagram of the remote console connector circuit (RCCC) 121. RCCC 121 includes a conventional PCI connector 211 for physically and electrically connecting the RCCC 121 to PCI bus 120. RCCC 121 also includes a controller 205, such as a i960 processor sold by the INTEL CORP. Controller 205 is operably coupled to the PCI bus 120 via a PCI interface circuit 212 (such as the MG 9063 by the AMI CORP.) and local bus 220. RCCC 121 also includes a memory 207 (e.g., a DRAM chip) and flash ROM all operably coupled via local bus 220.

RCCC 121 also includes circuitry for providing and receiving data to the remote console of a remote computer system over a telephone network or other communications network. A personal computer memory card industry association (PCMCIA) controller 223 and PCMCIA PC Card 225 are utilized to provide and receive data over telephone network 240. PC card 225 includes a modem and a telephone network connector. A corresponding modem 241 of remote computer system 245 is operably coupled to telephone network 240 to provide and receive data signals to and from remote computer system 245 that includes a remote mouse 133, display monitor 123, and keyboard 131. PC card 225 may include other circuits for operably coupling RCCC 121 to a remote console over other communication networks such as a WAN.

RCCC 121 further includes a LAN controller 210 and LAN connector 227 (such as a 10 Base-t connector), which are conventional, for providing and receiving data to other devices via a LAN such as an ethernet network. With some computer systems, the remote console is operably coupled to the RCCC 121 via a LAN. Other RCCC circuits may include circuitry from providing data to a remote location via a wireless network such as a cellular phone network.

Figure 3:
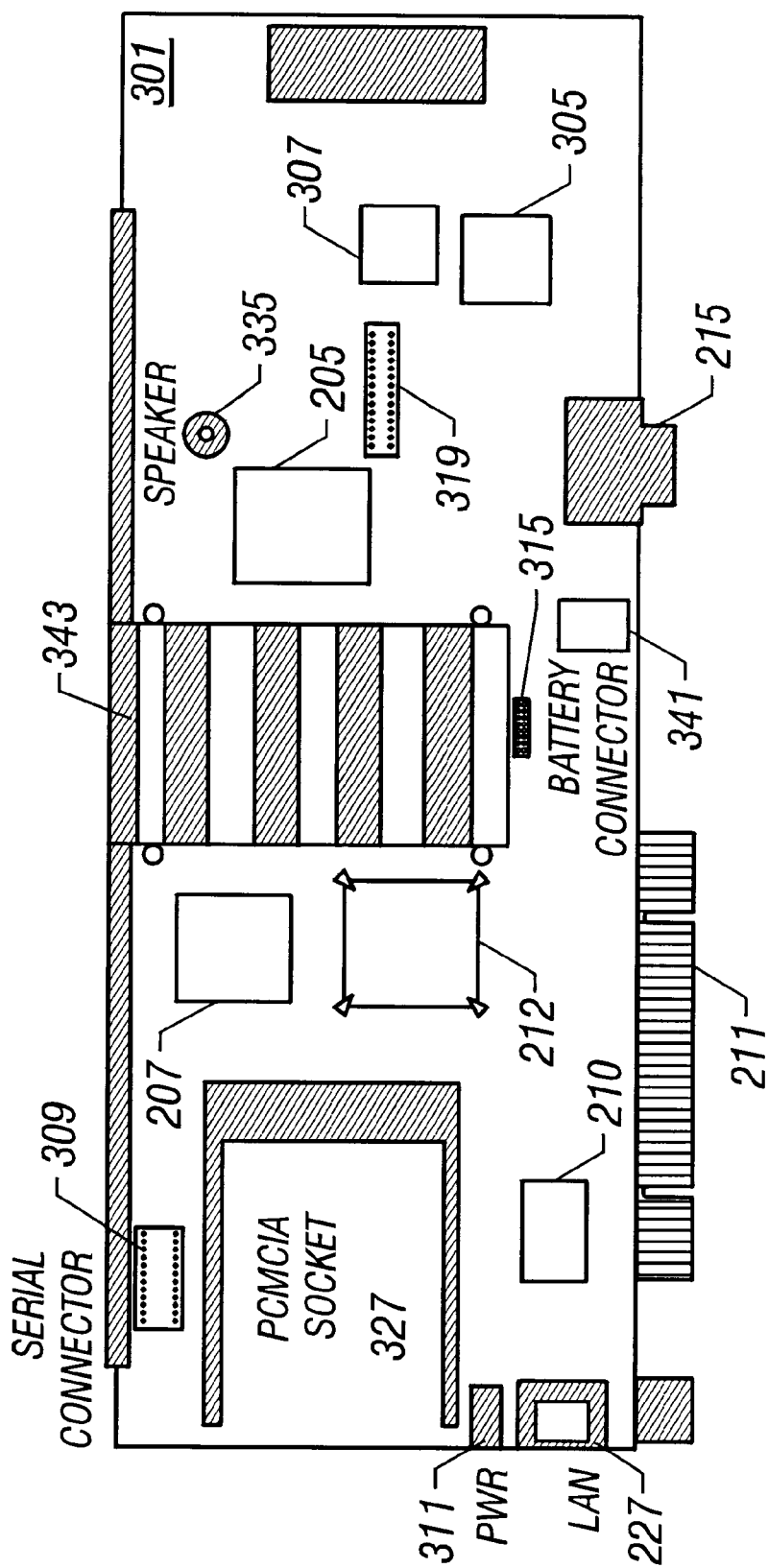
FIG. 3 is a side view of a bus expansion card according to the present invention.

Referring to FIG. 3, the RCCC 121 circuit is implemented on a PCI expansion card 301 or other type of daughter card. When card 301 is installed in computer system 101, PCI connector 211 is inserted into a corresponding PCI expansion connector slot (not shown) which is connected to the PCI bus 120 and is physically located on the system motherboard (not shown). Also, when card 301 is installed, an auxiliary connector 215 is mated with a corresponding connector physically coupled to the system mother board. Auxiliary connector 215 is a 20 pin board-to-board type of connector that operably couples controller 205 to a system management interrupt (SMI) controller 131 In FIG. 2, controller 205 includes an output terminal connected to auxiliary connector 215 for providing a signal to SMI controller 131 to generate a SMI interrupt. In other embodiments, RCCC 121 includes a decoder circuit (not shown) connected to the local bus and addressable by controller 205. When directed by controller 205, the output of the decoder provides a signal to the SMI controller 131 via the auxiliary connector 215. SMI Controller 131 provides an SMI signal (see FIG. 1) to the system processor SMI input terminal (not shown).

Auxiliary connector 215 provides and receives other signals to and from the RCCC 121 such as communication signals between server management hardware located on the card (not shown) and environmental components and devices located throughout the server 101 cabinet such as fan controllers, environmental monitors, and/or environmental controllers embedded on the motherboard. The network connection components located on the card such as the PC card 225 (FIG. 3 shows the PC Card socket 327) and LAN connector components 227 and 210 may be utilized to provide environmental information about the server to remote user or device. Auxiliary connector 215 may carry other side band signals between the RCCC 121 and other computer system components. Card 301 also includes a power connector 311 and a battery pack 343 and battery connector 315 for providing power and back up power to the RCCC 121, respectively. Card 301 also includes a non volatile memory (FLASH 341) and a serial port 309 for debug or external modem.

Figure 4:
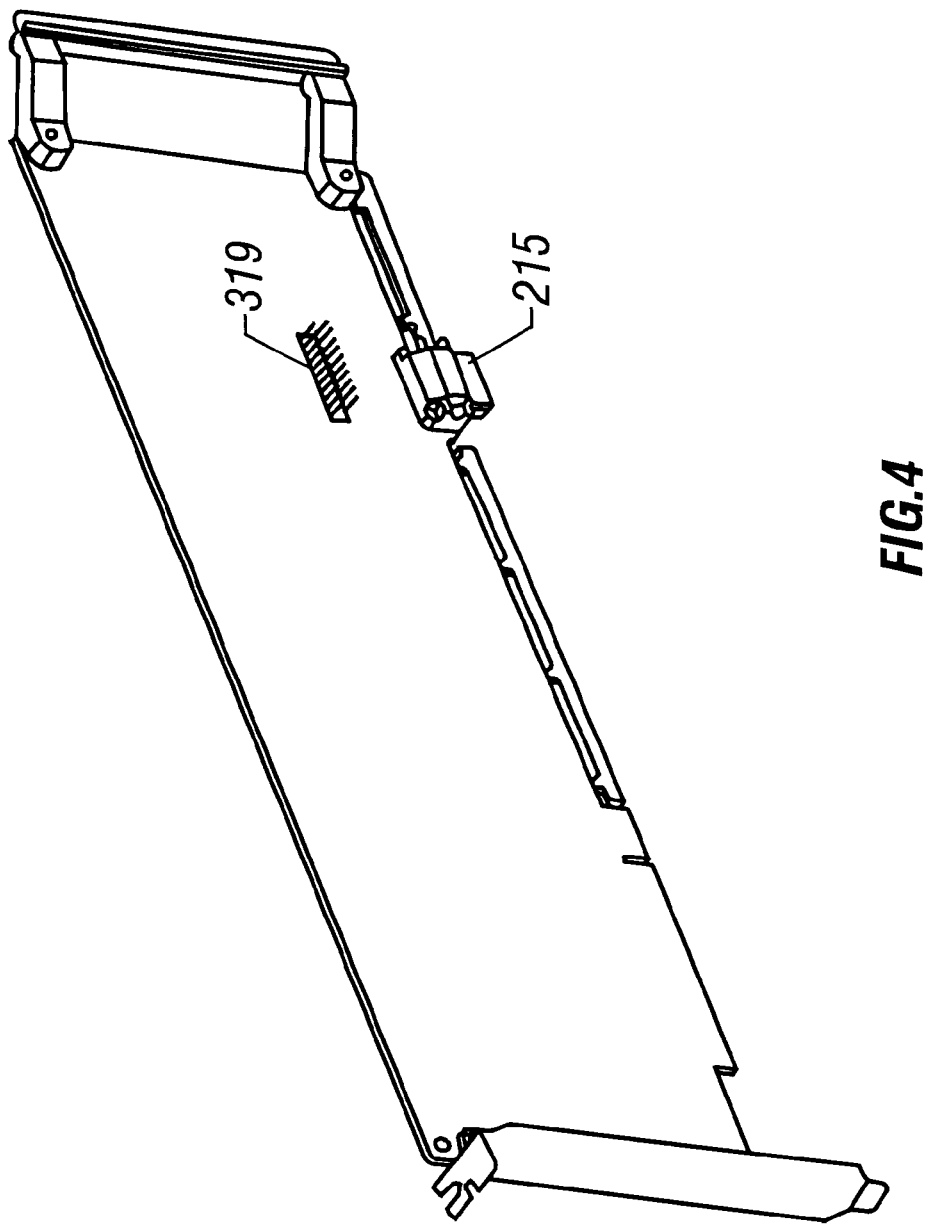
FIG. 4 is a perspective view of a bus expansion card according to the present invention.

FIG. 4 shows a perspective view of PCI expansion card 301.

Referring back to FIG. 1, the AGP accelerator 113 provides video data to local display monitor 119 via the frame buffer 117. Because accelerator 113 obtains the video data via the AGP port of chipset 109 as per the AGP standard, RCCC 121 (located on the PCI bus 120) can not snoop the video data being provided to the local display monitor 119 via the accelerator circuit 113.

During the operation of server 101, the host operating system (such as a modified version of WINDOWS NT sold by the MICROSOFT CORP.) includes a device driver that provides the video data being provided to the local monitor 119 to the RCCC 121. However, prior to the booting up of the WINDOWS NT based operating system, the RCCC 121 periodically generates an SMI (or alternatively another assignable interrupt to RCCC 121) to the system processor 105 via the interrupt controller 131 to obtain video data being displayed on local monitor 119. In response to determining that the interrupt was generated by the RCCC 121, system processor 105 copies the video data being provided to AGP accelerator 113 to a memory location that is accessible by both the system processor and RCCC 121 (a shared memory location). The shared memory location may be located in system memory 111, a memory circuit of the RCCC 121 (such as memory 207), or any other memory circuit that is accessible by both the system processor and RCCC 121. Also, in response to determining that the interrupt was generated by RCCC 121, system processor 105 obtains data generated by remote keyboard 131 and remote mouse 133. This data, transferred to RCCC 121 via network 240, is placed in the shared memory location by RCCC 121 where it is accessed by system processor 105 in response to determining that the interrupt was generated by RCCC 121.

An advantage performing video redirection utilizing the SMI is that the SMI is "host operating system independent." Regardless of what operating system the server is running at the present time, generating a SMI places the system processor in System Management Mode (SMM) where it executes the interrupt handler.

Figure 5:
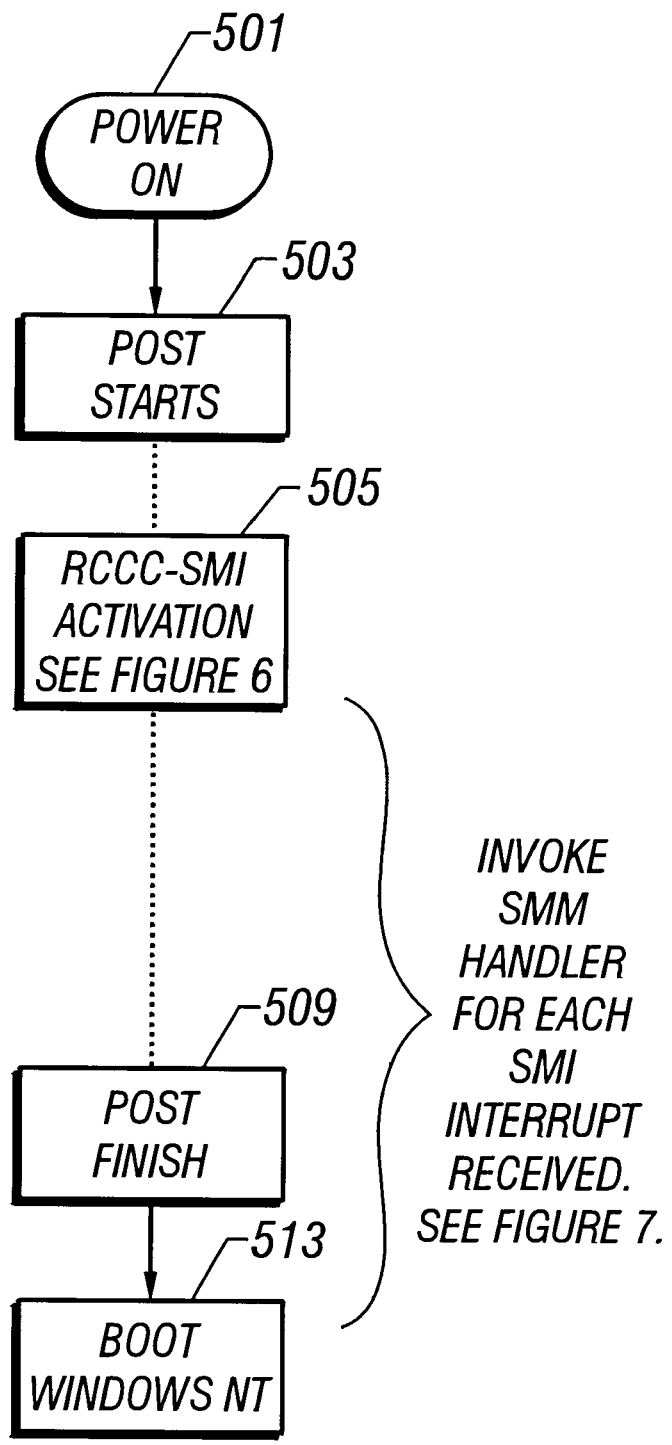
FIGS. 5 and 6 are flow diagrams showing portions of a computer system startup routine according to the present invention.
Figure 6:
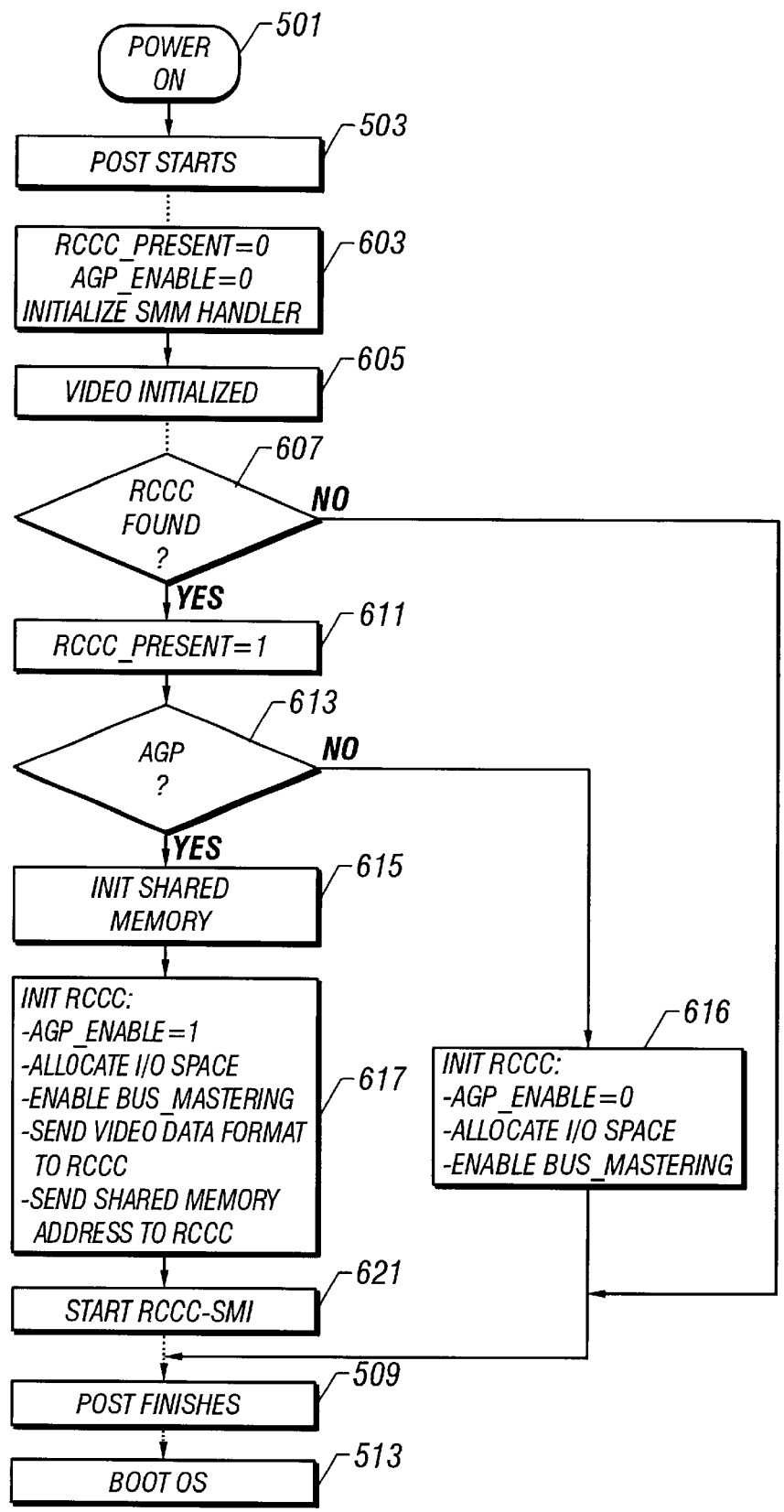

FIGS. 5, and 6 show an exemplary start up routine executed by the system processor for booting up the computer system according to the present invention. The code for implementing at least a portion of the routine is initially stored in flash ROM 107. After power to server 101 has been turned on, system processor 105 begins executing a power-on self-test (POST) routine. Typically during a POST routine, diagnostic routines are run to ensure that the various components of system 101 are functioning properly before the server begins normal operation. During the POST routine shown in FIGS. 5 and 6, activation of the RCCC-SMI feature is performed (See FIG. 5) to enable server 101 to implement remote console redirection. Afterwards, the RCCC 121 periodically generates a SMI. In response to each SMI, system processor 105 enters System Management Mode (SMM) and invokes a SMM interrupt handler (See FIG. 7) to determine the source of the interrupt and to correspondingly write the video data being provided to the local monitor 119 to a shared memory location where it is accessible by the RCCC 121. The RCCC 121 accesses the shared memory location to retrieve the video data and provides the video data to the remote monitor 123 for display thereon.

Referring to FIG. 6, prior to the activation of the RCCC-SMI feature, the RCCC_PRESENT flag and the AGP_ENABLE flag are initially set to zero and the SMM handler is initialized in operation 603. In 605, the local video connector circuit is initialized. In 607, the system processor searches for a remote console connector circuit. If the RCCC 121 is not found, the system processor executes the remaining portion of the POST routine (not shown), by-passing the rest of the RCCC-SMI activation.

If the RCCC circuit 121 is found, the RCCC_PRESENT flag is set to 1 in 611. In 613, system processor 105 searches to determine whether the AGP feature will be implemented in system 101. If not, in 616, the RCCC 121 is initialized to perform other functions for server 101 such as snooping the data writes on the PCI bus 120 (if the local video controller is operably coupled to the system via PCI bus 120) and providing system environmental information to a remote location via the RCCC 121. I/O and memory space is allocated to the RCCC 121 and bus mastering is enabled to enable the system processor 105 to transfer data to and from the RCCC 121. The AGP_ENABLE flag is set to zero so as to disable the RCCC-SMI feature of the RCCC 121.

If the AGP feature is being utilized by system 101, in 615 the shared memory location is initialized or allocated for receiving video data to be displayed on remote monitor 123. In one computer system, the shared memory location is physically located in a DRAM chip of system memory 111 and has, for example, a physical address of 0EC000h. However, with other systems, the shared memory location may be located on the RCCC 121 card, a CMOS memory circuit, or other non volatile memory. Also, the shared memory may be placed in the system memory at a location below the base 640K memory.

In initializing the RCCC 121 to implement the RCCC-SMI feature, the processor sets the AGP_ENABLE flag to one. Also in 617, the RCCC 121 is enabled to perform bus mastering to access the system memory via PCI bus 120 to obtain the video data from the shared memory location in system memory 111. I/O and memory space is allocated to the RCCC 121 to enable system processor 105 to transfer data to and from the RCCC 121.

Also in 617, the system processor provides the RCCC 121 with the format that the video data is to be written in the shared memory location. With one system for example, the video data written in the shared memory has a video text mode format of a block of 80 columns by 25 lines. The address of the shared memory location is also provided to the RCCC 121 in 617.

After the initialization of the RCCC 121 in 617, system processor 105 signals the RCCC 121 to start generating SMI periodically. The RCCC 121 begins generating interrupts at periodic intervals during the POST procedure until a Window NT based operating system boots up in 513. With one computer system, RCCC 121 generates a SMI every one second. Other computer system may have a different interval period. For example, a RCCC may generate a SMI every 750 milliseconds. The shorter the interval the faster the remote view is updated. However, a shorter interval also requires the system processor to enter SMM mode more often, thereby limiting the bandwidth of the system processor to perform other tasks of the start-up routine. RCCC 121 would snoop bus 120 for keystrokes from local keyboard 143 or mouse strokes from local mouse 145.

To generate an SMI interrupt, RCCC controller 205 signals via auxiliary connector 215 to interrupt controller 131 to provide an interrupt signal to a SMI input of the system processor 105.

Figure 7:
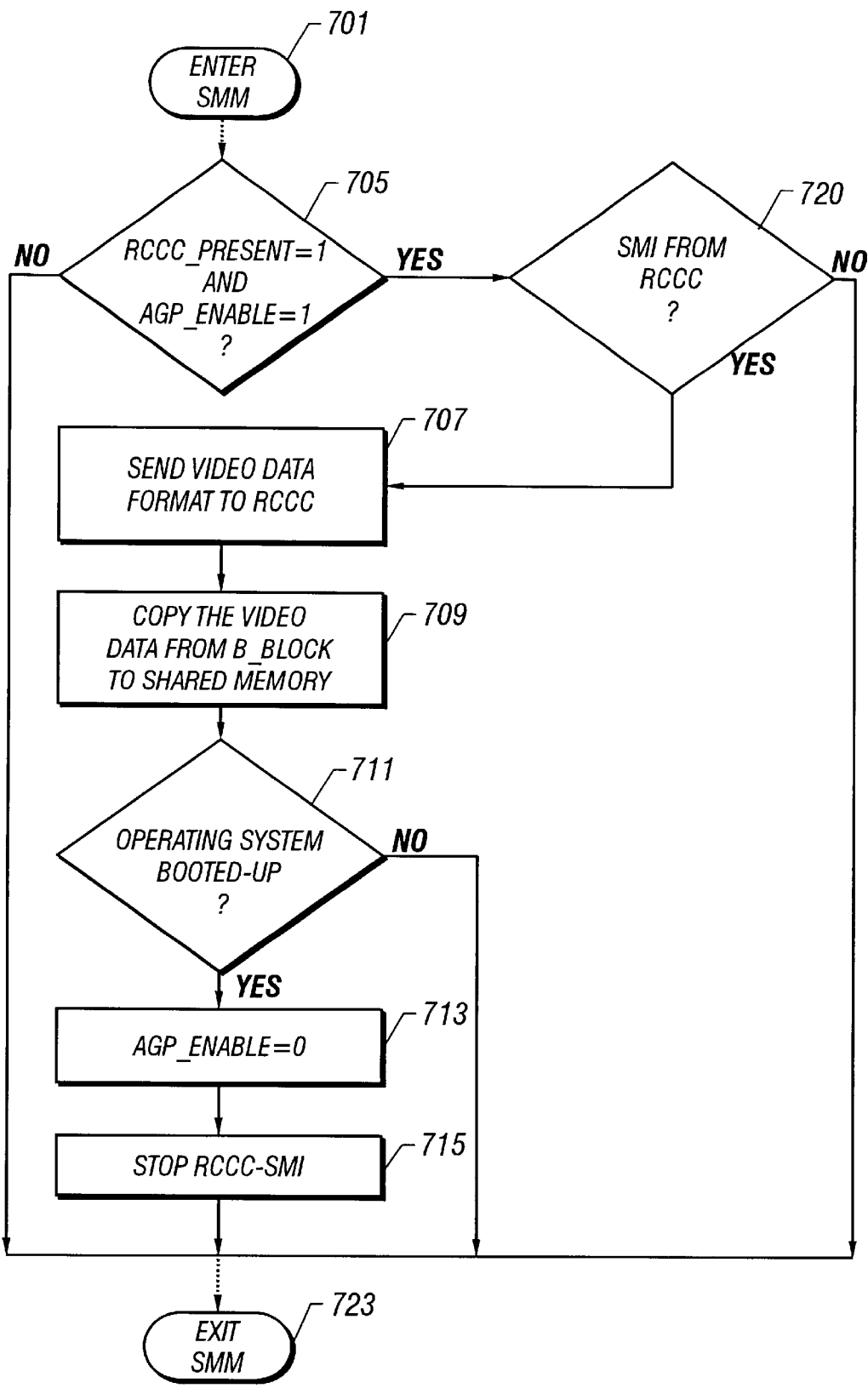
FIG. 7 is a flow diagram showing a portion of an interrupt handler according to the present invention.

Referring to FIG. 7, in response to receiving the SMI signal from interrupt controller 131, system processor 105 enters a system management mode (SMM) and invokes an interrupt handler. To determine the component or event that generated the SMI and to perform corresponding operations based upon the determination. The flow diagram shown in FIG. 7 represents the portion of the interrupt handler that determines whether the RCCC 121 generated the interrupt and the operations performed by the processor in response to the RCCC circuit generating the interrupt. Not shown in FIG. 7 are other conventional portions of the SMI handler that determine whether other components or events generated the SMI and the corresponding operations to be performed in response thereto. For example, typically a SMI may be generated by system hardware in response to a single-bit ECC memory error. The portion of the handler shown in FIG. 7 may be performed at anytime during the execution of the handler as illustrated by the dashed lines between the enter SMM 701 and exit SMM 723 operations.

In 705, the RCCC_PRESENT flag and AGP_ENABLE flag are checked to see if both the RCCC 121 is present and the AGP feature is being utilized. If either of these conditions is not true, system processor 105 proceeds to the next portion of the SMM interrupt handler (not shown). If both conditions are true, then system processor 105 determines whether the SMI was generated by the RCCC 121 in 720. In generating an SMI, RCCC 121 sets a register accessible by system processor 105 to indicate that the RCCC 121 generated the SMI. In 720, the system processor 105 reads the register via the PCI bus to determine that the SMI was generated by the RCCC 121 circuit. However, other conventional techniques for determining the source of an interrupt may be used such as, for example, a processor accessing a register of an interrupt controller whose value indicates the device or event that generated the interrupt.

If its determined that the SMI was not generated by the RCCC 121, the processor continues executing the remaining portion of the interrupt handler (not shown).

If the RCCC 121 generated the interrupt, then in 707, the system processor checks the video data format that the video data will be written to the shared memory and provides that format to the RCCC 121. The video data format is provided to the RCCC in response to each SMI because the video data format may have changed since the last SMI such as from the booting up of an operating system e.g. NETWARE sold by NOVELL or WINDOWS NT from MICROSOFT.

In 709, system processor copies the video data from the B_block (or A_block) of system memory to the shared memory. The B-block (hex address 0B8000h-0BFFFFh) of system memory 111 is the memory location where the video data is stored that will be provided to the local monitor 119 via the AGP accelerator circuit. With one server, the video data is copied to memory location EC000, which is the memory location of the shared memory for that server.

After the video data has been copied in 709, system processor 105 checks to see if WINDOWS NT has booted up. If so, then the AGP_ENABLE flag is set to zero in 713 and system processor signals the RCCC 121 to stop generating SMIs in 715. Afterwards, the system processor proceeds executing the remaining portion of the SMI interrupt handler. Because the AGP_ENABLE flag has been set to zero, the next time that another component generates an SMI, the system processor 105 will not have to access registers on the RCCC (as in 720) to determine that the RCCC 121 did not generate the SMI. If in 711 it is determined that WINDOWS NT has not been booted up, system processor 105 proceeds executing the remaining portion of the SMI interrupt handler.

Referring back to FIG. 5, a non-graphical operating system (such as NETWARE) may be booted up after the POST finishes in 509. Referring back to FIG. 7, because the SMI handler includes providing the video data format to RCCC 121, the RCCC 121 is able to provide video data to the remote monitor 123 even though a new operating system has been booted up and utilizing a different video data format.

The routines shown in FIGS. 5–7 are exemplary routines for enabling a server to perform remote console redirection. The ordering of some of the operations shown in FIGS. 5–7 may be varied.

The SMM handler as shown in FIG. 7 may be modified so that the system processor checks to see if a change from text mode to graphics mode has occurred. If a change to graphics mode has occurred, the system processor will not write video data to the shared location in response to subsequent SMIs. The RCCC circuit may continue to generate SMIs to which the system processor continues to invoke the SMM handler in response thereof. If a change back to text mode is determined, the system processor will resume writing video data to the shared memory location in response to the SMIs.

Other modifications may be made to the remote monitor redirection technique shown in FIGS. 5–7. For example, the RCCC-SMI feature may be disabled if the server supports a chaining of video data writes to the B_block (or A_block). Some operating systems, such as DOS offered by the MICROSOFT CORP., utilize a particular BIOS routine to write video data to a memory location that is accessible by the local console video controller. An example of such a routine is an "INT10h" BIOS routine that is invoked to write video data to the B_block of system memory. The INT10h routine can be chained such that every time video data is written to the B_block, the same video data is also written to the shared memory location. This is accomplished by modifying the INT10h routine to call the RCCC redirection routine during each execution of the INT10h routine.

Implementing a chaining of the video data writing routine to perform console redirection has an advantage over the RCCC-SMI technique in that system processor 105 does not have to periodically service SMIs. However, if a system does not use a BIOS routine to write video data, video redirection can not be achieved via chaining.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A computer system comprising:

a system processor;

a first monitor connector circuit operably coupled to the system processor, the first monitor connector circuit being provided video data for display on a first display monitor when operably coupled to the first monitor connector circuit;

a second monitor connector circuit operably coupled to the system processor, the second monitor connector circuit providing the video data to a second display monitor for display thereon, wherein the second monitor connector circuit generates an interrupt to the system processor to obtain video data being provided to the first display monitor connector circuit.

2. The computer system of claim 1 wherein the second monitor connector circuit generates an interrupt periodically to obtain video data being provided to the first monitor connector circuit.

3. The computer system of claim 2 wherein the second monitor connector circuit generates the interrupt periodically to obtain video data during a startup routine executed by the system processor.

4. The computer system of claim 2 wherein the second monitor connector circuit generates an interrupt at a periodic interval to obtain video data being provided to the first monitor connector circuit.

5. The computer system of claim 1 wherein the interrupt is a system management interrupt (SMI).

6. The computer system of claim 1 wherein the interrupt is a host operating system independent interrupt.

7. The computer system of claim 1 further comprising:

a shared memory location accessible by both the system processor and the second monitor connector circuit, wherein the second monitor connector circuit obtains the video data by the system processor writing the video data to the shared memory location and the second monitor connection circuit accessing the video data in the shared memory location.

8. The computer system of claim 7 further comprising:

a system memory operably coupled to the system processor;

wherein the shared memory location is located in the system memory.

9. The computer system of claim 7 wherein the system processor writes video data in the shared memory location in response to the system processor determining that the interrupt was generated by the second monitor connector circuit.

10. The computer system of claim 1 wherein the first monitor connector circuit includes circuitry substantially compliant with an Accelerated Graphics Port (AGP) standard.

11. The computer system of claim 1 wherein the first monitor connector circuit includes:

a graphics accelerator.

12. The computer system of claim 1 further comprising:

a chipset, wherein the first monitor connector circuit is operably coupled to the system processor via the chipset, the second monitor connector circuit is operably coupled to the system processor via the chipset, and the system processor is operably coupled to a system memory via the chipset.

13. The computer system of claim 1 further comprising:

a computer bus substantially conforming to a Peripheral Component Interconnect (PCI) standard, the second monitor connector circuit operably coupled to the computer bus, wherein the second monitor connector circuit obtains the video data via the computer bus.

14. The computer system of claim 1 further comprising:

a computer bus, the second monitor connector circuit operably coupled to the computer bus, wherein the second monitor connector circuit obtains the video data via the computer bus;

wherein the second monitor connector circuit is implemented on a card, the card including:

a physical computer bus connector for coupling the second monitor connector circuit to the computer bus; and a second physical connector for coupling the second connector circuit to a second monitor.

15. The computer system of claim 1 further comprising:

an interrupt controller operably coupled to the second monitor connector circuit and having an output electrically coupled to an interrupt input of the system processor for providing an interrupt signal to the system processor, wherein the second monitor connector circuit generates an interrupt signal by signaling to the interrupt controller to provide the interrupt signal to the system processor.

16. The computer system of claim 1 wherein:

the computer system is a server.

17. The computer system of claim 1 wherein:

the first monitor is a local monitor of the server;

the second monitor is a remote monitor.

18. The computer system of claim 1 wherein the system processor substantially conforms to an X86 architecture.

19. The computer system of claim 1 wherein the second monitor connector circuit generates a plurality of interrupts to obtain video data.

20. The computer system of claim 19 wherein the plurality of interrupts are generated during a startup routine executed by the system processor.

21. The computer system of claim 1 wherein the interrupt is generated during a startup routine executed by the system processor.

22. The computer system of claim 1 further comprising:

a computer bus, the second monitor connector circuit resides on the computer bus, the first monitor circuit does not reside on the computer bus.

23. The computer system of claim 1 further comprising:

a computer bus, the second monitor connector circuit obtains the video data via the computer bus;

wherein the video data is not being provided to the first monitor connector circuit via the computer bus.

24. Method for performing remote monitor redirection in a computer system comprising:

providing video data to a local monitor connector circuit;

generating an interrupt to a system processor;

providing the video data to a remote monitor connector circuit in response to the interrupt for display on a remote display monitor.

25. The method of claim 24 further comprising:

displaying the video data on a local display monitor.

26. The method of claim 24 further comprising:

displaying the video data on a remote display monitor.

27. The method of claim 24 wherein the interrupt is a system management interrupt (SMI).

28. The method of claim 24 wherein the providing the video data to the remote monitor connector circuit further comprises:

writing the video data to a shared memory location;

accessing by the remote monitor connector circuit the video data in the shared memory location.

29. The method of claim 24 wherein the providing the video data in response to the interrupt, to the remote connector circuit further comprises:

receiving the interrupt by the system processor;

determining that that the interrupt was generated by the remote monitor connector circuit;

providing the video data to the remote connector circuit in response to the determination that the interrupt was generated by the remote monitor connector circuit.

30. The method of claim 24 further comprising:

generating a plurality of interrupts to a system processor;

providing video data being provided to the local monitor connector circuit to the remote monitor connector circuit in response to each of the plurality of interrupts.

31. The method of claim 30 wherein the interrupts are generated during a startup routine executed by the system processor.

32. The method of claim 30 wherein each of the plurality of interrupts is generated at a periodic interval.

33. The method of claim 32 wherein:

the periodic interval is approximately one second.

34. The method of claim 24 wherein the video data is provided to the local monitor connector circuit substantially as per an Accelerated Graphics Port (AGP) standard.

35. A connector circuit for providing video data to a remote monitor for remote monitor redirection comprising:

a connector for operably coupling the connector circuit to a computer bus; and a controller, the controller generating an interrupt to a system processor for the connector circuit to obtain via the computer bus and via the connector video data provided to a local monitor connector circuit.

36. The connector circuit of claim 35 wherein the interrupt is a system management interrupt (SMI).

37. The connector circuit of claim 35 wherein the interrupt is a host operating system independent interrupt.

38. The connector circuit of claim 35 wherein the controller generates the interrupt by signaling an interrupt controller to provide an interrupt signal to the system processor.

39. The connector circuit of claim 38 further comprising:

an auxiliary connector, the controller signals the interrupt controller via the auxiliary connector.

40. The connector circuit of claim 35 wherein the connector circuit obtains the video data by accessing a shared memory location, wherein the video data is written to the shared memory location by the system processor in response to the interrupt.

41. The connector circuit of claim 40 wherein the shared memory location is a memory location in a system memory.

42. The connector circuit of claim 35 further comprising:

a memory, the system processor writing to the memory the video data in response to the interrupt.

43. The connector circuit of claim 35 wherein the connector includes an edge type connector for insertion into a computer bus slot connector.

44. The connector circuit of claim 35 wherein the computer bus substantially conforms to a Peripheral Component Interconnect (PCI) bus standard.

45. The connector circuit of claim 35 wherein the connector circuit is implemented on a daughter card.

46. The connector circuit of claim 35 further comprising:

a modem circuit operably coupled to the controller for providing the video data to a remote display monitor via a communications network.

47. The connector circuit of claim 35 further comprising:

a network connector for providing the video data to a remote display monitor via a local area network (LAN).

48. The connector circuit of claim 35 wherein the controller periodically generates an interrupt to obtain video data provided to a local monitor connector circuit.

49. The connector circuit of claim 48 wherein the controller periodically generates the interrupt during the startup of the computer system.

50. The connector circuit of claim 48 wherein the controller periodically generates the interrupt at a periodic interval.

51. The connector circuit of claim 50 wherein the controller periodically generates the interrupt at an interval in the range of 100 milliseconds to 1500 milliseconds.

52. The connector circuit of claim 35 wherein the system processor is a system processor for a server.

53. The connector circuit of claim 35 wherein the controller generates the interrupt during the startup of the computer system.

54. A server comprising:

a system processor;

a system memory operably coupled to the system processor;

a local monitor connector circuit operably coupled to the system processor, the local monitor connector circuit being provided video data for display on a local display monitor when operably coupled to the local monitor connector circuit, the local monitor connector circuit including circuitry substantially compliant with an Accelerated Graphics Port (AGP) standard;

a computer bus;

a remote monitor connector circuit operably coupled to the system processor via the computer bus, the remote monitor connector circuit providing video data to a remote monitor for display thereon, wherein during a startup routine executed by the system processor, the remote monitor connector circuit generates a system management interrupt (SMI) to the system processor to obtain the video data provided to the local monitor connector circuit.

55. A computer system comprising:

a system processor;

a system memory operably coupled to the system processor;

a local monitor connector circuit operably coupled to the system processor, the local monitor connector circuit being provided video data for display on a local display monitor when operably coupled to the local monitor connector circuit;

a computer bus, wherein video data is not being provided to the local monitor connector circuit via the computer bus;

a remote monitor connector circuit operably coupled to the system processor via computer bus, the remote monitor connector circuit providing video data to a remote for display thereon, wherein during a startup routine executed by the system processor, the remote monitor connector circuit generates an interrupt to the system processor to obtain the video data provided to the local monitor connector circuit.

* * * * *